US008832020B2

(12) United States Patent
Landy et al.

(10) Patent No.: US 8,832,020 B2
(45) Date of Patent: Sep. 9, 2014

(54) METHOD AND SYSTEM FOR SAFELY TRANSPORTING LEGACY DATA TO AN OBJECT SEMANTIC FORM DATA GRID

(75) Inventors: Mark Joseph Landy, Montvale, NJ (US); Jimmy Chou, Upper Saddle River, NJ (US); Tej Anand, Chappaqua, NY (US); Tanya Kaplun, Wayne, NJ (US); Sarah Mord Myers, Rockaway, NJ (US); Peter Foreman, Baskin Ridge, NJ (US)

(73) Assignee: Medco Health Solutions, Inc., Franklin Lakes, NJ (US)

( * ) Notice: Subject to any disclaimer, the term of this patent is extended or adjusted under 35 U.S.C. 154(b) by 177 days.

(21) Appl. No.: 13/296,825

(22) Filed: Nov. 15, 2011

(65) Prior Publication Data

US 2012/0150797 A1   Jun. 14, 2012

Related U.S. Application Data

(60) Provisional application No. 61/456,963, filed on Nov. 15, 2010.

(51) Int. Cl.
*G06F 17/00* (2006.01)
*G06F 17/30* (2006.01)

(52) U.S. Cl.
CPC ............................ *G06F 17/30563* (2013.01)
USPC ......................................... 707/602; 707/762

(58) Field of Classification Search
USPC ................. 707/602, 758, 759, 760, 761, 762
See application file for complete search history.

(56) References Cited

U.S. PATENT DOCUMENTS

| 2004/0143562 A1* | 7/2004 | Chen et al. ....................... 707/1 |
| 2006/0235899 A1* | 10/2006 | Tucker ........................ 707/200 |
| 2007/0112823 A1 | 5/2007 | Baatz et al. |
| 2008/0133469 A1 | 6/2008 | Chen et al. |

OTHER PUBLICATIONS

International Search Report and Written Opinion from International application No. PCT/US11/60793, issued Feb. 21, 2012.

* cited by examiner

*Primary Examiner* — Hosain Alam
*Assistant Examiner* — Bruce Witzenburg
(74) *Attorney, Agent, or Firm* — Husch Blackwell LLP (57) ABSTRACT

A computer system architecture and process transforms the organizing principles of business data management seen in traditional or common place settings across disparate data stores into an object-semantic model. The transformation is implemented in a transitory, managed risk implementation approach for data access migration. This approach will enable data agility and will move data storage closer to information storage, while supporting the rapid development of business capabilities. This approach will bridge the gaps between relational database/file based storage (less expressive) and object-semantic representation (more expressive). This process/method will connect information residing in legacy data structures such as relational database/file based storage on disk drives to instances populating an expressive object-semantic model in persistent grid based memory. It will also maintain a linkage between the original legacy data to the enhanced object-semantic data allowing for ongoing modernization and removing the need for point migrations.

14 Claims, 8 Drawing Sheets

FINDINGS - DATA RETRIEVAL WORKED AS PLANNED; DATA MANIPULATION
RETURN ASCII AND EBCDIC REQUIREMENTS EXPOSED

- DATA STORED AS A NUMBER
- POS EXPECTS A STRING
- AND VICE VERSA

NUMBERS vs. STRINGS
410

SAME DATA ELEMENT
- ELIG-ACCREDO-DISPENSE-IND VALUE = "0"
- ELIG-ACCREDO-DRG-LST-ID: VALUE = 0

NUMBER WITH A SPACE
- ELIG-CLIENT-PA-NBR: VALUE = "00000000000 "

- THERE IS NO SUCH THING AS A "DATE" IN COBOL
- DIFFERENT PROGRAMMERS SOLVED THIS DIFFERENT WAYS

DATES
420

DATE DEFINED AS 8 DIGIT NUMBER
- ELIG-CAP-BNFT-START-DTE
- PIC S9(08) COMP-3.
- DEFAULT VALUE = 0

STRANGE DEFAULT DATE VALUE
- VALUE = "00010101"

DIFFERENT FORMATS
- YYMMDD
- DDMMYY
- DDMMYYYY
- YYYYMMDD

- DIFFERENT PROGRAMMERS USED DIFFERENT CONVENTIONS FOR INDICATOR VALUES
- DIFFERENT DEFAULT VALUES

INCONSISTENT VALUES
430

CHOICE VALUES
- "Y"/"N"
- 0/1
- 0/9
- "A"/"I"
- TRUE/FALSE

DEFAULT VALUES
- "A" VS ""
- 0 VS 9

METHOD AND SYSTEM FOR SAFELY TRANSPORTING LEGACY DATA TO AN OBJECT SEMANTIC FORM DATA GRID

CROSS-REFERENCE TO RELATED APPLICATIONS

This application claims the benefit under 35 U.S.C. §119 (e) of U.S. Provisional Patent Application No. 61/456,963, filed Nov. 15, 2010, which is hereby incorporated by reference herein in its entirety.

FIELD OF THE INVENTION

The present invention generally relates to systems and methods for transporting legacy data structures to an object semantic form data grid.

BACKGROUND OF THE INVENTION

Large businesses, enterprises, and organizations have recently experienced extensive growth in the size and of their data and its complexity. Many large businesses rely on "legacy" data systems that may be duplicative and incompatible and that may include complex, heterogeneous mix of relational databases and files with point to point replication connections amongst them. Legacy data systems also often utilize database management systems ("DBMS") or file management systems that cannot accommodate dynamic schema changes. These legacy data systems have become brittle because they require many successive enhancements and extensions around the data. These legacy data systems may each have different software requirements, requiring more than just one software upgrade to update the entire data system.

We have determined that the major organizing principle of data commonplace in Information Technology ("IT") organizations needs to be fundamentally transformed to support the agility and scalability needed in today's business. One of the problems is that traditional IT topologies force businesses to choose between either having massive scale data storage or having performance and flexibility. For example, a business may have many platforms, where each platform maintains or executes a function that furthers the business's goals. Multiple of these platforms may utilize the same data, but each platform may store its own set of data, despite the fact that the data is commonly used amongst platforms. When the data is changed by one of the platforms, each legacy data system must update its data, potentially slowing down the business's computing functions. The more platforms a business has, the more time is required to update the data in each of these platforms.

However, businesses based on these legacy data systems may find it difficult and risky to continue executing their business during the transportation of data from their legacy systems to a new system. A problem faced by businesses is the major investment of funds into transporting their legacy data, only to have that data fail on the new system after major costs have been incurred. Such failures can occur because of the complexities and changes in the business priorities in the new data systems. Another reason why major transitions often fail is that there is no acceptable interim state. Processes that transport data require converting all the legacy data to the new system and then terminating the access to the legacy data system, resulting in an inability to access or operate on the legacy system. This can cause the business to be at high risk for creating data integrity issues and potentially losing the connections to the previous legacy data.

SUMMARY OF THE INVENTION

The Solution

In some embodiments, the present invention may provide a solution to the loss of data context that occurs when transporting data from legacy data system. The present invention may allow the legacy data to remain connected and used during data transport. The relationship between the legacy data may be maintained while the legacy data is transported or migrated to a unified data grid allowing a real-time publish/subscribe relationship to be maintained. The data is then gradually transformed from a legacy representative model to an object-semantic model. However, during the migration or transportation of data, the system may maintain the option to convert back access, in whole or in part, to the legacy data model. The termination or "cut-over" of access from the legacy data may be made gradually and opportunistically, allowing a business the ability to revert to the legacy data system if problems are encountered during data transportation.

In some embodiments, the present invention may provide interim state(s) during transportation or migration of data. Each interim state may provide benefits due its richer expressiveness such that even if the target state is never reached, the business will have gained extensive gains in agility, performance and productivity.

The Target State

In some embodiments, the present invention may provide a target state. The target state may minimize the "traditional requirements" of software driven development that occur when managing data. The data storage may become extensible because it is in a memory based footprint as opposed to data that is traditionally stored on physical storage systems, such as DBMS or file management systems. The in-memory based footprint offers the benefit of accommodating dynamic schema changes. The target state allows closer alignment of technology and business while providing fast and safe delivery of new business platforms. As data is transported, an organization's technical staffs energy can be focused on creating new business platforms, instead of supporting and modifying overly complex and fragile software code.

The use of in-memory grid data is inherently more extensible and expressive, allowing for simultaneous and compatible worldviews of the same data by multiple business platforms. This offers benefits that cannot be achieved in RDBMS or file collection systems, in which the organizing principle of the data casts the data in a direction that can only be undone through replication or re-implementation. RDBMS based metadata approaches offer the appearance of virtualizing column and data names, but in doing so can cause non-linear compute loads which halts scale to usable levels.

In some embodiments, the present invention allows technology and business initiatives to converge by "speaking the same language" when data is stored in an object-semantic model. The object-semantic model can be organized in the way the business operates as opposed to the traditional organization based on the way the system processed the data. The present invention may ensure or allow the use of common business term definitions to be implemented directly in the actual data layer, as opposed to using the common definitions as a programming guide which requires translations by a person.

In some embodiments, the present invention may create platforms according to business, rather than technical, needs. This may allow the business to create applications without having to understand the technical details of a data storage layer which is twice removed from the business. During a transportation process, the legacy data may be lifted into the unified data grid and then extracted, transformed, and loaded ("ETL") into object models while still leaving the opportunity to convert the data back to the legacy model.

In some embodiments, the present invention may allow business intent to closely align to the manner in which data and data rules are made visible in automation, thereby optimizing the necessary steps to create or change automation. The business may be allowed to change at the rate of its business needs. The present invention may create re-usable pieces of code, reducing the amount of locations where items need to be changed, therefore decreasing design, development and testing time while increasing delivery speeds. A wide scope may be created, allowing the implementer to reach a range scale of a business and increasing the business's maneuverability. By organizing the data with the method and system of the present invention, the implementer may provide the business with meaning.

In some embodiments, the present invention provides for storing legacy data in an object-semantic model, as opposed to a tabular model. The object-semantic model may provide the benefits of allowing the business's data to be organized according to business need. The object-semantic model may also provide the benefits of increased speed and agility in data retrieval and decreased query complexity. The present invention may also provide the benefits of easy and safe methods for adding new attributes to the object-semantic model.

Starting Assumptions

Business Enterprise has a complex, heterogeneous mix of legacy relational databases and files with a number of point to point replication connections amongst them.

Enterprise may support multiple platforms.

Stage 1: Setup & Publish Data to the Unified Data Grid

Establish unified data grid to support in-memory data storage.

Publish legacy tabular data to the unified data grid.

Stage 2: Point to the Unified Data Grid (Increases Performance)

Begin to modify platforms to access legacy data sources on the unified data grid in their existing form.

Perform parallel tests.

Go live with modified platforms that access the unified data grid

Cut platforms over to access the unified data grid as the data source of record in production. This may be done gradually (capability by capability) on an opportunistic basis so as not to disrupt business.

Stage 3: Create Simple Object Framework (Improve Enterprise Data Search and Navigation)

In a separate partition of the unified data grid, create an object framework.

Map legacy tabular data structures into unified data grid based objects (this mapping occurs within in in-memory grid so performance concerns of traditional database mapping are removed).

Modify platforms to conditionally point to either the tabular data on the unified data grid or the object data on the unified data grid.

Perform parallel tests.

Go live with modified platforms to access the modified form of object data on the unified data grid instead of the tabular data on the unified data grid. This may be done gradually (capability by capability) on an opportunistic basis so as not to disrupt business.

Stage 4: Re Factor Legacy Code to Leverage Object Model (Simplify Code Base and Align Code with Business Intent)

Begin to modify legacy code to utilize objects instead of legacy tabular record sets.

At the same time, modify the related platforms to serve objects instead of tabular data sets, or the old tabular data sets.

Perform parallel tests.

Cut legacy code and related platforms over to the object model gradually in production on an opportunistic basis so as not to disrupt business.

Stage 5: Implement Rules Engine and Semantic Network (Leverages Power and Enforcement of Semantic Network and Configurability of Rules Engine)

Harvest rules from legacy code and begin to implement them in rules engine(s) and semantic relationships between objects.

Collapse legacy code as it is replaced by rules engine(s) and Reasoner processing. This may be done gradually on an opportunistic basis so as not to disrupt business.

Perform Parallel Tests.

Cut legacy code and related platforms over to the semantic network gradually in production on an opportunistic basis so as not to disrupt business.

In some embodiments, the present invention may transport data from a legacy system to an object framework data grid. In some embodiments, the present invention may publish legacy data to a data grid and may convert legacy data functionality to grid functionality. In some embodiments, the present invention may enable an object framework which may access the data grid. In some embodiments, the present invention may modify legacy access to the object framework. In some embodiments, the present invention may convert computer legacy code to a semantic network, and retrieves rules from the legacy data system for use in the semantic network.

In some embodiments, the present invention may publish data from the legacy data system with an extract, transform, load tool. In some embodiments, the present invention may perform parallel tests on the legacy data storage and the unified data grid and determine whether the results of the test are substantially the same. In some embodiments, the present invention may perform parallel tests on the legacy data functionality and the grid data functionality to and determines whether the results of the test are substantially the same. In some embodiments, the present invention may perform parallel tests on the legacy code and the semantic network and determines whether the results of the test are substantially the same. In some embodiments, the present invention may generate parallel test reports. In some embodiments, the present invention may provide the capability of rolling-back access to enable usage of legacy code to access legacy data. In some embodiments, the present invention may enable selective roll-back by a switch that points to legacy code. In some embodiments, the present invention may enable mapping that includes dynamically mapping target state objects to the unified data grid. In some embodiments, the present invention may convert legacy code by either re-factoring, simplifying and/or collapsing the legacy code. In some embodiments, the present invention may include a rules decision engine with a reasoned module for enforcing and inferring semantic relationships. In some embodiments, the present invention may retrieve rules based on criteria for selecting optimal rules in the semantic network. The present invention may enable converting legacy data functionality on a platform by platform basis. The present invention may enable synchronizing legacy data storage and the data grid after publishing. The present invention may enable a real-time publish/subscribe relationship between the legacy data and the object framework. The data grid of the present invention may include an in-memory based footprint that can accommodate dynamic schema changes.

In some embodiments of the present invention, the present invention may advantageously enable a computer transportation system for transporting data from a legacy data system to an object framework data grid. The computer transportation system may include a legacy data system, a data grid, a computer for converting access from the legacy data system to the data grid, a switch with a roll-back capability, legacy code, collapsed code that may include re-factored legacy code, a legacy rules data base, a grid rules database, and/or a rules decision engine that access the collapsed code and the data grid.

In some embodiments of the present invention, the present invention may include a legacy mapping module in the data grid. In some embodiments of the present invention, the present invention may convert, on a platform by platform basis, access from the legacy data system to the data grid. In some embodiments of the present invention, the present invention may perform parallel tests on the legacy code and the collapsed code and may determine whether the results are substantially similar. In some embodiments of the present invention, the present invention may synchronize the legacy data system and the data grid.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which:

FIG. 5 depicts illustrative screen shots of meta data that may be compared for legacy data and grid data;

FIG. 8 depicts illustrative screen shots of the parallel testing results from the comparison of the legacy data and the data grid.

DETAILED DESCRIPTION OF PREFERRED EMBODIMENTS OF THE INVENTION

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention. For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The present invention relates to methods and systems for transporting data from a legacy data storage system to an unified data grid and for converting a legacy system to an object semantic form.

Stage 1: Replicate Fixed Data to the Unified Data Grid

In some embodiments, in the first stage, the data may be transported in the form fixed length records or relational database format from its current legacy disk based data source to a distributed memory grid across geographic locations. The transportation process allows the data and its access to be kept the same before, during and after the transportation process. As data is being transported, data should be continually replicated to the unified data grid to maintain a (temporary) parallel state. The parallel state can support parallel testing and roll-back to the original state if there is any problem with the transfer of data to the unified data grid.

Stage 2: Point to the Unified Data Grid

In some embodiments, in the second stage, business platforms may be modified such that the platform may have the option of accessing the unified data grid instead of as accessing the legacy data store. Prior to switching access to the unified data grid, parallel tests may be performed. The system may allow for roll-back to the legacy data system should there be issues with the data grid or its access. Although the legacy data structures are not modified, the in-memory storage should increase performance. Roll-back may be implemented by having a switch or a pointer that indicates which data source (legacy or grid) should be the source of accessing the data. Either the data source (legacy or grid) should return the data in the same format so that there are no effects on the application attempting to access the data. The roll-back can be achieved by setting the switch pointer back to the legacy data system. All data between legacy data store and the data grid should be synchronized for a period of time after the switching the data from the legacy data store to the data grid, or vice versa. Because the data structure itself has not changed, minimal changes will be needed to the application layer.

Stage 3: Create Simple Object Framework (Improve Enterprise Data Search and Navigation)

In some embodiments, in the third stage, the legacy records and field may be dynamically mapped to target state objects in the unified data grid. This mapping may occur quickly because communication within unified data grids is fast, whereas such mapping would not have been possible in disk based systems. The records or relational databases of the legacy system may be populated into an object semantic model by reference (not duplication) in order to provide interoperability. That is, in order to provide the system backward compatibility with legacy code while developing new features based on the new object system, object data may be mapped to prove correctness pre-launch and to provide a bridge while platforms are transformed. The enterprise object model on the unified data store can provide greatly enhanced enterprise data search and navigation. Meanwhile, the system can access the data in the application layer in the legacy model, creating an interim state that limits the impacts of any issues that may occur with the objects in the unified data grid.

Stage 4: Re-factor Legacy Code to Leverage Object Model (Simplify Code Base and Align Code with Business Intent)

In some embodiments, in the fourth stage, the true value of the simple enterprise object model is that the application layer code can be refactored, simplified, and better aligned with business once the data is available in business-understandable object form.

Data access abilities, such as services in a Service Oriented Architecture, can be built to conditionally serve the data in the legacy tabular form or in the new object form. The application layer code can then be refactored opportunistically over time to use the object form. However, the system may maintain the ability to roll-back its data access to the previous application code through a switch. This fourth stage is also an interim stage that may limit the impact of any issues that may occur with the unified data grid.

Stage 5: Implement Rules Engine and Semantic Network (Leverages Power and Enforcement of Semantic Network and Configurability of Rules Engine)

In some embodiments, in the fifth stage, over time, business rules can be harvested from the business platforms and the application code. These rules may be implemented into a rules engine and in semantic relationships between the objects. A Reasoner may be implemented to enforce and infer the semantic relationships. The rules engine and semantic network offer the advantage of simplifying the application code and introducing advanced business intelligence.

The following FIGS. 1-8 and their accompanying descriptions provide detailed examples of the implementation of the systems and methods of the present invention in accordance with one or more embodiments of the invention.

Figure 1:
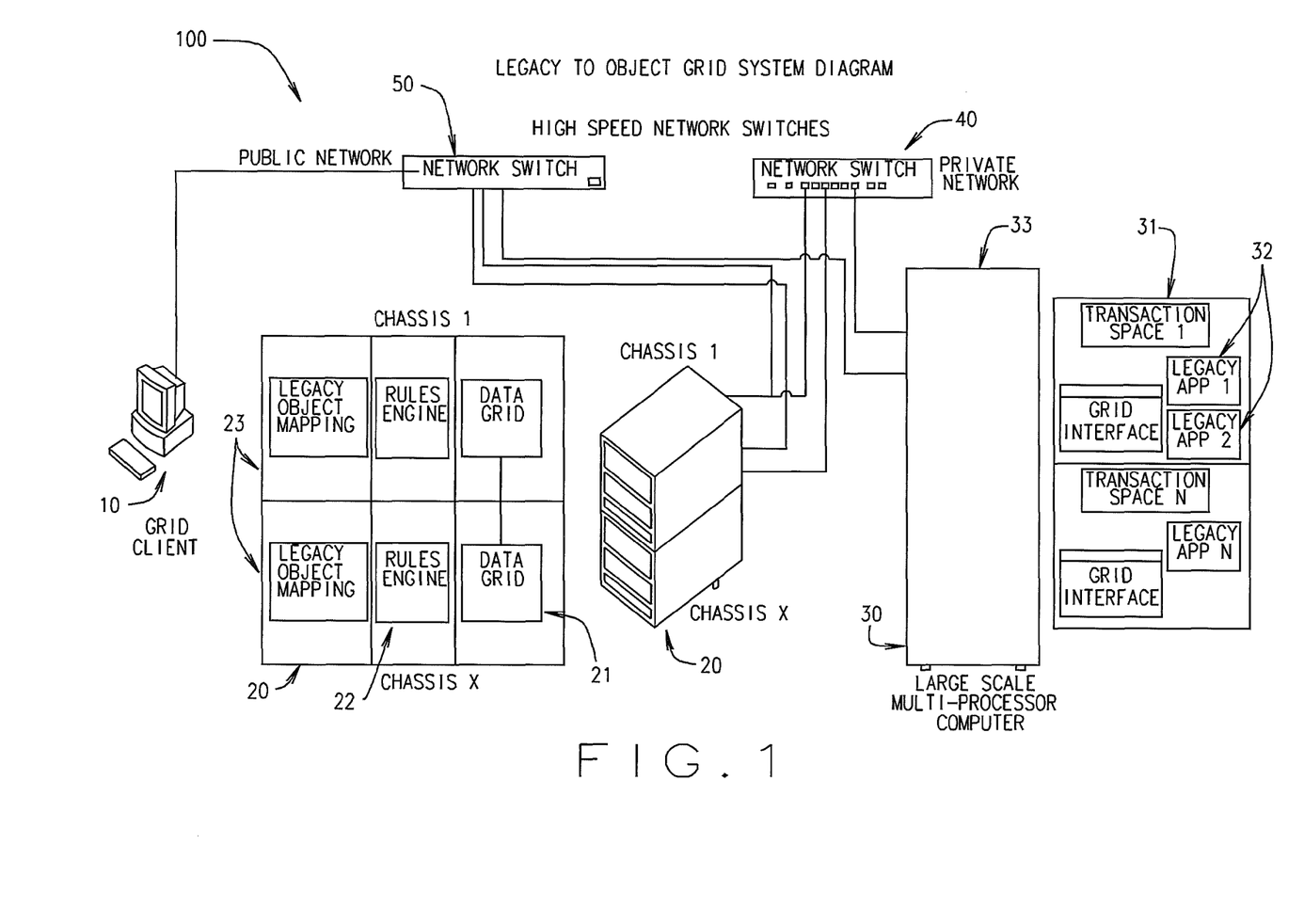
FIG. 1 is a schematic diagram of an illustrative system for transporting data from a legacy system to an object semantic form data grid in accordance with some embodiments of the present invention.

FIG. 1 is an example of a system and devices for practicing the invention in accordance with some embodiments of the invention. The system 100 may include at least one legacy data systems, which may include relational databases and files. The system 100 includes a grid client 10, chassis 20, at least one computer 30, one or more network switches 40, and at least one network switch 50.

The grid client 10 may include a part of or an entire business platform that may have accessed legacy data storage. In some embodiments, the grid client 10 may be an open system and may be implemented on one or more computing systems, such as, for example, IBM mainframes, Intel x86 based computing systems, mid-range Unix servers, and/or mobile devices. For purposes of this invention, a business "platform" may include one or more computers with one or more data storage and operating systems. The operating systems may be capable of operating one or more software applications which support a business. The platform may be directed towards implementing the goals or needs of any type of business in any type of industry. For example, a business that is directed to medical benefits may have a platforms directed to member eligibility, client profiles, prescriber information, pharmacy networks, maximum allowable cost files, National Drug code master file, provider claims, patient history, plan file, prior authorization, formulary, patient coverage, drug utilization review, accumulators, retail strategy lock, copay and pricing, benefit setup/design, practitioner/prescriber, orders and clinical setup.

The grid client 10 may be connected to the chassis 20 via network switch 50 and to the computer 30 via the network switches 40. The business platform(s) running on the grid client 10 can be transported from the legacy data system to data grid(s) 21 on chassis 20. During transportation from the legacy data store to the data grid, the business platform(s) on the grid client 10 will not experience any interruption in data access and will not even be aware of the transition of data from the legacy system to the data grid.

The chassis 20 are composed of one or more chassis, that each include may include one or more of the following: at least one data grid 21, at least one rules engine 22, and at least one legacy object mapping 23. The chassis 20 is preferably connected to the computer 30 via at least one of the network switches 40.

For purposes of the present invention, a "data grid" is capable of providing rapid access to data, stability, redundancy and scalability. The data grid 21 may allow the controlled sharing and management of large amounts of distributed data. In certain preferred embodiments, the data grid 21 is comprised of a commercially available in-memory data grid, such as, for example, Gemfire products from Gemstone Systems, Inc. and VMware Inc. While one of ordinary skill in the art would appreciate the process and characteristics of the data grid 21, in certain embodiments, the data grid 21 may comprise of data stored in random access memory which is striped and duplicated across two or more, and preferably five data banks. In certain preferred embodiments of the invention, each data bank is backed up to a redundant array of inexpensive disks. The data grid 21 may include an object-framework that provides a centralized access point to the data stored in the data grid 21. The data grid 21 provides data agility, such as, for example, the ability to quickly update data through a business intelligent, centralized access source for a variety of platforms. For example, in a medical benefits industry, a business platform may revise its pharmaceutical regulations which were previously stored in a legacy data store. The data grid 21 would receive the updated pharmaceutical regulations, consult its legacy object mapping to determine which data should be updated, and then quickly update the relevant data grid memory space. This intelligent determination saves the system the processing time required by legacy models in which the system must search for each legacy data store and then sequentially update each legacy data store.

The legacy object mapping 23 may include mapping information that can map the data access information from the object framework model back to the legacy data access model. For example, the legacy object mapping 23 may include a mapping from the legacy model to an object framework model. The information stored in the legacy object mapping 23 may allow a system to access the information in the data grid 21 through the legacy format, the grid format, or a combination of both. Due to these properties, the legacy object mapping 23 further allows the transition to the data grid 21 to be transparent to any grid client that is operating in part or in whole on a legacy access model. The legacy object mapping 23 and the data grid 21 increase the agility of data access by providing a centralized source for business oriented data access from multiple business platforms and multiple grid clients.

The rules engine(s) 22 may implement a business's rules and their semantic relationships. The rules implemented by the rules engine 22 may be stored in the chassis 20. For purposes of this invention, "rules" includes information and logic relevant to business decisions. These rules may relate to any type of business in any type of industry. For example, the rules may relate to validation, workflow processing, and/or specialized logic. And, in a more specific example of a medical benefits business, (i) the validation rules may relate to valid ranges for an insurance co-pay or for a set of valid identifiers for males or females across different platforms; (ii) the workflow processing rules may direct a business objective based on a preset workflow sequence (for example, the workflow processing rule may require that an incoming claim enter a prescription filling sequence after the claim is validated); and (iii) specialized logic may require that certain claims be processed. "Semantic relationships" may relate to the classification of data used by the business. For example, in a medical benefits business, examples of semantic relationships include that a male cannot receive pregnancy benefit or that a receiver of an insulin prescription is a diabetic. The semantic relationships may include information relevant to any type of business in any type of industry. The rules engine(s) 22 may include a Reasoner module that may make determinations based on the rules and the semantic relationships. As data is transported to the data grid 21, the system may determine which rules should be harvested or selected for use by the Reasoner and the rules engine 22 in making determinations using the data grid 21. For examples, relating to the medical benefits example above, rules relating to validation would be harvested because they assist in improving the agility and scalability of the system using the data grid 21, while rules relating to work flow would not be harvested because their usage in the data grid 21 would not be optimized. The rules utilized in the rules engine 22 may be selected or harvested from a legacy set of rules. The rules may be selected based on logic that optimizes the type of rules that are applicable to the data grid 21.

The computer 30 is preferably a large scale multi-processor mainframe computer. Alternatively, the computer 30 may include one or more computing systems known to one skilled in the art at the time of the invention. The computer 30 preferably includes one or more of the following: at least one transaction space 31, one or more legacy application spaces 32, and at least one grid interface 33. Prior to implementing the data grid 21, the computer 30 would have stored and/or accessed legacy data in response from various clients, such as, for example the grid client 10.

The transaction space 31 on the computer 30, prior to the implementation of the data grid 21, would have executed legacy applications that may have retrieved legacy data and/or implemented decision rules logic. Once a business, enterprise, or organization begins transporting legacy data to the data grid 21, the transaction space 31 may allow the legacy application(s) 32 to interface and utilize the data grid 21. The transaction space 31 may include the legacy application(s) 32 and the grid interface 33. The transaction space 31 may include memory and/or code that conduct the transportation of data access from the legacy data store to the data grid. The transaction space 31 may include the ability to roll-back access from the data grid to the legacy data if any problems occur during and/or after the data transportation. The transaction space 31 may also include the ability of gradually transporting data access (platform by platform), thus increasing the reliability and scalability of the system.

The transaction space 31 may perform parallel tests to compare the data returned through access of the data grid 21 versus the data returned through access of the legacy data storage. For example, when the data grid 21 is first established, the transaction space 31 may perform parallel tests that compare the legacy data system to the data published in the data grid 21 and may determine whether the legacy data was properly published to the data grid 21. The transaction space 31 may determine whether the legacy data and the data grid 21 have substantively same results. When determining whether the results are substantively the same, the transaction space 31 may recognize differences or idiosyncrasies in the format in the data grid 21 versus the format of the legacy data. For example, the legacy data may store phone numbers in a format that required a space after the telephone number or may have stored the phone numbers in an alphanumeric format, whereas the data grid 21 may store telephone numbers in a numeric format with no space. The transaction space 31 may include logic that determines whether the phone number is the same, despite the differences in the format storing the information in the legacy system and the data grid 21. The transaction space 31 may also perform parallel tests that compare the data being accessed by legacy code in a legacy application versus modified, simplified or refactored code that accesses the object framework network in the data grid 21. The transaction space 31 may determine whether the comparison of these parallel tests returns substantively the same results, even if the legacy data and the data grid 21 store information in different formats. The object framework mapping may be organized around the business's data goals in order to optimize the data's agility.

The legacy application space 32 may include legacy code or logic that allows a business client to access business applications. For the purpose of this invention, the "legacy applications" refers to functionality that may support in whole or in part a business platform. For example, in a medical benefits industry, the legacy applications may perform functions related to determining claim adjudication, prescription pricing, claim history, order processing, order status, billing, therapeutic rules management, and interaction between drug rules. The legacy application space 32 may receive a request from a client, such as the grid client 10, and then determine whether to access the legacy data storage or the data grid 21 to fulfill that request. Prior to establishing the data grid 21, the legacy application space 32 may respond to requests by executing legacy code that accesses the legacy data system.

When the legacy data is transported to the data grid 21, the legacy code in the legacy application space 32 may be modified, simplified or re-factored to access the data grid 21. The legacy code in the legacy application space 32 may then be collapsed or decommissioned into collapsed or new code that accesses the data grid 21, instead of the legacy data system. The legacy application space(s) 32 access may be converted to access the data grid 21 in whole or in part, in a gradual process that may convert access application by application. Even after the legacy application space 32 has been converted to access the data grid 21, the legacy application space 32 may include the legacy code that accesses the legacy data system.

For example, during an interim state of testing, the legacy application space 32 may retain its ability to roll-back its access to the legacy data system if there are any issues with the data accessed on the data grid 21. During this interim state, changes to the data in the data grid 21 will be synchronized with the data in the legacy data system, and vice versa. The legacy application space 32 may include a pointer or a switch that allows the legacy application space 32 to roll-back access to the legacy data system. The pointer or switch may allow the legacy application space 32 to conditionally use the legacy code based on whether there are issues with access to or the data in the data grid 21. The legacy application space 32 may be modified gradually, on a platform by platform basis, to modify access to the data grid from the legacy data system. However, by retaining the roll-back ability, the legacy application space 32 may increase the robustness of the system if issues arise with the data grid.

The grid interface 33 may include an interface for interfacing the transaction space 31 with the data grid 21. The grid interface 33 may provide an access point to the data grid 21 for the legacy application space 32. The grid interface 33 may determine the relevant rules information or mapping if the legacy application space 32 makes a request to the data grid using legacy code. The grid interface 33 may be an application programming interface ("API") that communicates data transportation and transaction management to the data grid 21.

Figure 2:
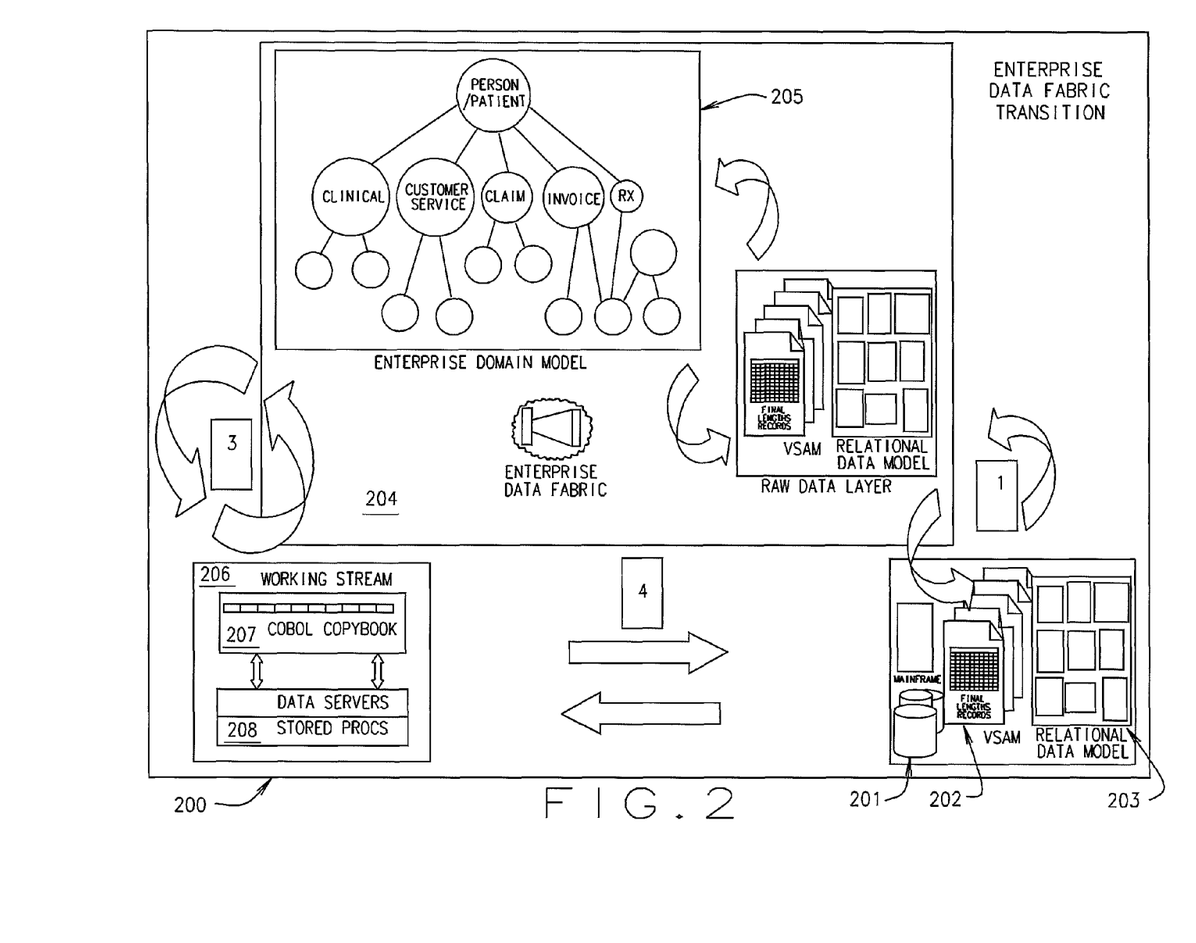
FIG. 2 depicts an illustrative high level diagram of a system and flow chart for transporting a legacy data structure into an object semantic form in accordance with some embodiments of the present invention.

FIG. 2 is an example of a system and method for practicing the present invention in accordance with some embodiments of the invention. Flow diagram 200 illustrates stages 1, 2, 3, and 4 for transporting or migrating data to a unified data grid. The stages 1, 2, 3, and 4 may be performed in combination or separately. A business may choose to not perform in whole or in part one or more of the stages 1, 2, 3, and 4.

With reference to FIG. 2, in some embodiments, in the stage 1 the present invention may establish and publish legacy data 201 to a data grid system 204. For purposes of the present invention, a "data grid" is capable of providing rapid access to data, stability, redundancy and scalability. The data grid 204 may allow the controlled sharing and management of large amounts of distributed data. The data grid 204 may be a distributed memory grid across geographic locations. In certain preferred embodiments, the data grid 204 is comprised of a commercially available in-memory data grid, such as, for example, Gemfire products from Gemstone Systems, Inc. and VMware Inc. While one of ordinary skill in the art would appreciate the process and characteristics of the data grid, in certain embodiments, the data grid 204 may comprise of data stored in random access memory which is striped and duplicated across two or more, and preferably five data banks In certain preferred embodiments of the invention, each data bank is backed up to a redundant array of inexpensive disks.

After the data grid 204 is established, legacy tabular data from the legacy systems 201 may be published to the data grid. The legacy tabular data is the data stored in representational form of rows and columns in legacy systems 201, such as DBMS or RDBMS. In certain preferred embodiments of the invention, the publishing process is established with a class of tools known to one of ordinary skill in the art as an extract transform load (ETL) tool, such as for example, Ab Initio products. One of ordinary skill in the art will appreciate that the ETL will be capable of taking data from different existing form and transform it into data that will be uniformly readable and writeable. The legacy tabular data may be extracted from the legacy systems using an ETL tool and services and/or with custom applications.

In some embodiments, in the first stage, the data may transported in the form fixed length records 202 or relational database format 203 from its current disk based data source to the data grid 204. The transportation allows the data and its access to be kept the same before, during and after the transportation process. As data is being transported, data should be continually replicated to the unified data grid to maintain a (temporary) parallel state. The parallel state can support parallel testing and roll-back to the original state if there is any problem with the transfer of data to the unified data grid. After the data has been transported, the data in the legacy data system and the data grid may be continuously synchronized in order to maintain seamless roll-back if any issues arise with the data grid.

With reference to FIG. 2, in some embodiments, in the stage 2, the present invention may point to the data grid 204 established in the stage 1. In particular, the system 200 may allow one or more business platforms to access the data grid 204 instead of the legacy data system. The system 200 may modify the access of a business platform using an ETL tool. The ETL tool would allow the platform to view data that exists in more than one form of classification. For example, data for a male or female may be identified via numeric identifiers (e.g., assigning identifier 0 for male and identifier 1 for female) or alphanumeric identifiers (e.g., assigning identifier M for male and identifier F for female). The ETL tool would be able to identify and provide the data related to males or females whether the platform provided the numeric or alphanumeric identifier. Thus, the ETL tool is capable of receiving different identifiers for the same data from multiple platforms and translating those identifiers to the common data in the data grid. This provides the benefit of allowing multiple platforms to retain their identification system while allowing improving system performance by allowing these multiple platforms to simultaneously access the same data.

As each platform is granted access to the data grid 204, each platform gains the ability to read and write data to and from the data grid. In certain preferred embodiments of the invention, the present invention includes the synchronization of the platform's data access in both the data stored in the legacy data storage system and the data stored in the data grid.

The system 200 may perform parallel tests as the platform's data access is being modified. The parallel tests may be performed on the data saved in the legacy data storage systems, such as the legacy tabular data, as well as the data in the data grid, such as the above-mentioned RAM and RAID backup. The parallel test may be performed by software and/or applications that compare the data saved in the legacy system to the data transformed by the ETL tool. The parallel tests may include (i) extracting data from the legacy system with the ETL tool, (ii) comparing the extracted data, field by field with the data in the legacy system; (iii) comparing a platform application's access method to the legacy data system to make sure the results of the access are identical; and (iv) synchronizing any differences found during the comparison processes. After the comparison, the parallel tests may ensure that the ETL data transformation and copying were performed properly. The comparison process may include logic that determines whether the results from the data grid and the legacy data system are substantively the same despite being stored in different formats. In certain preferred embodiments, the parallel tests may provide a report including the number of successful and unsuccessful comparisons. The report may include exhibits demonstrating the failures when data was not properly transformed and saved. The report may also track the time needed to perform the parallel tests comparison.

The business platforms may go "live," that is convert their access and data storage to the unified data grid. After the system goes live, the business platforms may be converted to the unified data grid instead of the legacy data system. This process may be done gradually (platform by platform) on an opportunistic basis so as not to disrupt business activities.

In some embodiments, in the stage 2, business platforms may be modified such that the platform may have the option of accessing the data grid 204 instead of as accessing the legacy data store. The system may allow for roll-back to the legacy data store should there be issues with the data grid or its access. Although the legacy data structures are not modified, the in-memory storage should increase performance. Roll-back may be implemented by having a switch or a pointer that indicates which data source (legacy or grid) should be the source of accessing the data. Either the data source (legacy or grid) should return the data in the same format so that there are no effects on the application attempting to access the data. The roll-back can be achieved by setting the switch pointer back to the legacy data store. All data between legacy data store and the data grid should be synchronized for a period of time after the switching the data from the legacy data store to the data grid, or vice versa. Because the data structure itself has not changed, minimal changes will be needed to the application layer.

With reference to FIG. 2, in some embodiments, in the stage 3, the present invention may create a simple object framework 205. In some embodiments, the present invention may create an object frame work in separate partition of the data grid 204. The object frame work 205 may be an abstract layer that may store information relating to mapping of the physical layer. The object framework 205 can also store information relating to the business's relationships and behaviors. The relationships and behaviors may relate to any type of business in any type of industry. For example, a medical benefits business may rely on information relating to relationships between patients and insurance companies. This relationship information may be relevant to multiple businesses' platforms. In legacy systems, the relationship information would have to be saved for each of the platform. However, in the object-framework model, this relationship information would only need to be saved once allowing all business platforms a common access point and improving the system's speed and scalability.

In preferred embodiments, in order to establish the object framework, the legacy tabular data is mapped into data grid objects. In preferred embodiments, this mapping preferably occurs within the in-memory grid in order to remove the performance concerns of traditional database mapping. The business's platforms are then modified to conditionally point to either the legacy tabular data or the object data. When the unified data grid becomes the primary data store, all platforms will access the unified data grid.

The system may perform parallel tests as the legacy tabular data is mapped to the data grid objects. The parallel tests may be performed on the data saved in the legacy data systems, such as the legacy tabular data, as well as the data in the data grid. The parallel test may be performed by software and/or applications that compare the data saved in the legacy system to the data transformed by the ETL tool. The parallel tests may include comparing data accessed through the legacy tabular data to the data accessed through the data grid objects and synchronizing any differences found during the comparison. The comparison process may include logic that determines whether the results from the data grid and the legacy data system are substantively the same despite being stored in different formats. In certain preferred embodiments, the parallel tests may provide a report including the number of successful and unsuccessful comparisons. The report may include exhibits demonstrating the failures when data was not properly transformed and saved. The report may also track the time needed to perform the parallel tests comparison.

The business platforms may go "live," that is convert their access to the data grid 204 and the object framework 205. After the system goes live, the business platforms may be converted to access the object data on the data grid instead of the legacy tabular data. This process may be done gradually (platform by platform) on an opportunistic basis so as not to disrupt business activities.

With reference to FIG. 2, in some embodiments, in the stage 4, the present invention may modify legacy code using working stream 206 to leverage the object framework data grid model. As business platform access is transported to the data grid, the legacy code pertaining to the transported business platform is modified to utilize object-frame work objects instead of legacy data tabular record sets. The legacy code may be modified using a refactor that identifies when a business platform has been transported to the data grid and removes, decommissions, and/or edits the legacy code that allowed the transported business platform to access the legacy data systems. For example, the modification of the legacy code may be performed by the working stream 206 which includes a Cobol copybook 207 that modifies a data access layer 208. As the legacy code is modified, the system may modify the business platforms such that they access objects in the data grid instead of legacy tabular data.

The system may perform parallel tests as the legacy code is being modified. The parallel tests may compare the data being accessed by the legacy code and the data accessed by the data grid. The parallel tests may synchronize any differences found during the comparison. The comparison process may include logic that determines whether the results from the data grid and the legacy data system are substantively the same despite being stored in different formats. In certain preferred embodiments, the parallel tests may provide a report including the number of successful and unsuccessful comparisons. The report may include exhibits demonstrating the failures when data was not properly transformed and saved. The report may also track the time needed to perform the parallel tests comparison.

The business platforms may then be converted to access the objects on the data grid. After this conversion is complete, the legacy code may be decommissioned such that it no longer accesses the converted business platforms. This process may be done gradually (platform by platform) on an opportunistic basis so as not to disrupt business activities.

In some embodiments, the present invention may also harvest or select business rules from legacy code. For purposes of this invention, "rules" includes information and logic relevant to business decisions. These rules may be business, industry, client specific, and are not limited to a particular type of business, industry and/or client. The rules may relate to validation, workflow processing, and/or specialized logic. For example, in a medical benefits business, the validation rules may relate to valid ranges for insurance co-pay or for a set of valid identifiers for males or females across different platforms. These rules may be implemented in a rules engine that includes information relating to semantic relationships between objects. Semantic relationships relate to the classification of data used by the business. For example, in a medical benefits business, examples of semantic relationships include that a male cannot receive pregnancy benefit or that a receiver of an insulin prescription is a diabetic. The semantic relationships would include information relevant to the business and its industry, and are not limited to a particular business or industry type. The system may also include a Reasoner module that makes determinations based on the rules, the rules decision engine and the semantic relationships. As data is transported to the data grid, the system may determine which rules should be harvested for use by the Reasoner in making determinations using the data grid. For examples, rules relating to validation would be harvested because they assist in improving the agility and scalability of the system using the data grid, while rules relating to work flow would not be harvested because their usage in the data grid would not be optimized.

As the rules are harvested, legacy code related to the harvested rules may be decommissioned and replaced by the rules engine and Reasoner processing. This process may be done gradually on an opportunistic basis so as not to disrupt business activities.

The system may perform parallel tests as the legacy code is being decommissioned. The parallel tests may compare the data being accessed by the legacy code and the data accessed by the data grid. The parallel tests may synchronize any differences found during the comparison. The comparison process may include logic that determines whether the results from the data grid and the legacy data system are substantively the same despite being stored in different formats. In certain preferred embodiments, the parallel tests may provide a report including the number of successful and unsuccessful comparisons. The report may include exhibits demonstrating the failures when data was not properly transformed and saved. The report may also track the time needed to perform the parallel tests comparison.

The business platforms may be converted to access the semantic network. After this conversion is complete, the legacy code may be decommissioned such that it no longer accesses the converted business platforms. This process may be done gradually (platform by platform) on an opportunistic basis so as not to disrupt business activities.

Figure 3:
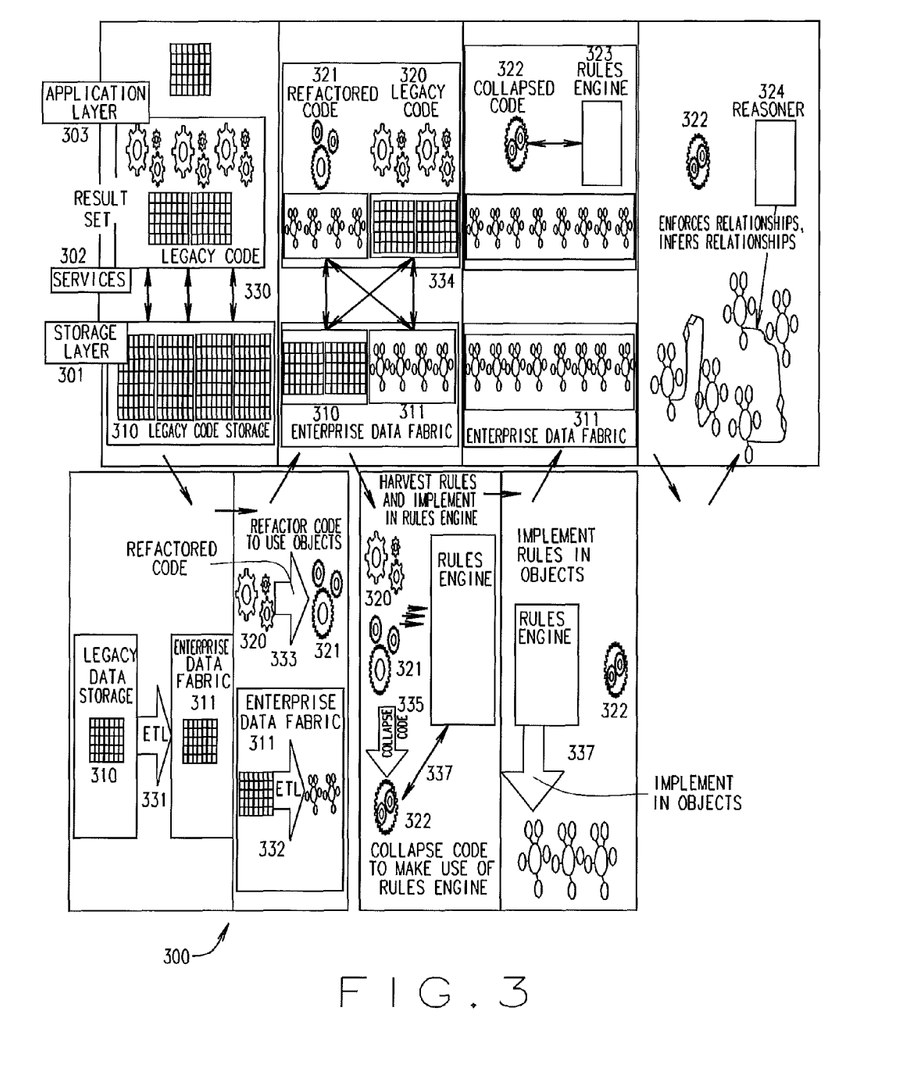
FIG. 3 depicts an illustrative high level diagram of a flow chart for transporting legacy data structures into an object semantic form data grid in accordance with some embodiments of the present invention.

FIG. 3 is also an example of a system 300 and method for practicing the present invention in accordance with some embodiments of the invention. The system 300 includes a storage layer 301, a services layer 302 and an application layer 303. The storage layer 301 includes legacy data storage 310 and data grid objects 311. The application layer 303 includes the legacy code 320, the re-factored code 321, the collapsed code 322, the rules engine 323, and the Reasoner 324. Prior to the transportation process of the present invention, business platforms access the legacy data storage 310 through the legacy code 320 at step 310.

At steps 331 and 332, the legacy data 310 may be transported to a data grid of objects 311. At step 331, legacy tabular data from the data storage 310 may be published. The legacy tabular data is the data stored in representational form of rows and columns in the legacy data storage 310, such as DBMS or RDBMS. In certain preferred embodiments of the invention, the publishing process is established with a class of tools known to one of ordinary skill in the art as an extract transform load (ETL) tool, such as for example, Ab Initio products. One of ordinary skill in the art will appreciate that the ETL will be capable of taking data from different existing form and transform it into data that will be uniformly readable and writeable. The legacy tabular data may be extracted from the legacy systems using an ETL tool and services and/or with custom applications.

At step 332, the legacy data storage 310 may be transported to the data grid objects 311 using an ETL tool. The ETL tool would translate the legacy data storage 310 into the data grid objects 311 by allowing data that exists in more than one form of classification to be unified in a single data grid object. For example, data for a male or female may be identified via numeric identifiers (e.g., assigning identifier 0 for male and identifier 1 for female) or alphanumeric identifiers (e.g., assigning identifier M for male and identifier F for female). The ETL tool would be able to identify and provide the data related to males or females whether the platform provided the numeric or alphanumeric identifier. Thus, the ETL tool is capable of receiving different identifiers for the same data from multiple platforms and translating those identifiers to the common data in the data grid. This provides the benefit of allowing multiple platforms to retain their identification system while allowing improving system performance by allowing these multiple platforms to simultaneously access the same data.

Although the legacy data structures are not modified, the in-memory storage should increase performance. The transportation allows the data and its access to be kept the same before, during and after the transportation process. As the legacy data 310 is being transported, data should be continually replicated to the data grid to maintain a (temporary) parallel state. The parallel state can support parallel testing and roll-back to the legacy data 310 if there are any problem with the transfer of data to the data grid 311. The parallel testing and roll-back provide a robust transportation system. Roll-back may be implemented by having a switch or a pointer that indicates which data source (legacy or grid) should be the source of accessing the data. Either the data source (legacy or grid) should return the data in the same format so that there is no effects on the application attempting to access the data. The roll-back can be achieved by setting the switch pointer back to the legacy data system. The platforms may be modified to optionally access the data grid 311 instead of the data storage 310.

With respect to step 333, the legacy code 320 can be refactored and/or simplified into the refactored code 321. This refactoring can better align the system's operations with the business's interests. Data access abilities, such as services in a Service Oriented Architecture, can be built to conditionally serve the data in the legacy tabular form or in the new object form. The legacy code 320 can be refactored into the refactored code 321 opportunistically over time. That is the legacy code 320 can be refactored platform by platform gradually over time. The refactor may identify when a business platform has been transported to access the data grid objects 311 and then may remove, decommission and/or edit the legacy code 320 that allowed the transported business platform to access the legacy data storage 310. For example, the modification of the legacy code 320 may be performed by a Cobol program that modifies a data access layer. As the legacy code 320 is modified, the system may modify the business platforms such that they access data grid objects 311 instead of legacy tabular data of the legacy data storage 310.

With respect to step 334, the system 300 may maintain the ability to roll-back its data access to the legacy code 320, creating an interim stage that may limit the impact of any issues that may occur with the data grid objects 311. The system may perform parallel tests as the legacy code 320 is being modified. The parallel tests may compare the data being accessed by the legacy code 320 and the data accessed by the data grid objects 311. The parallel tests may synchronize any differences found during the comparison. In certain preferred embodiments, the parallel tests may provide a report including the number of successful and unsuccessful comparisons. The report may include exhibits demonstrating the failures when data was not properly transformed and saved. The report may also track the time needed to perform the parallel tests comparison.

With respect to step 335, the business platforms may then be converted to access the data grid objects 311. After this conversion is complete, the legacy code 320 and the refactored code 321 may be collapsed such that the legacy code 320 is decommissioned such that it no longer accesses the converted business platforms. This process may be done gradually (platform by platform) on an opportunistic basis so as not to disrupt business activities. With respect to step 336, business rules can be harvested from the business platforms and the application code. As the rules are harvested, the legacy code 320 related to the harvested rules may be collapsed into the collapsed code 324 that utilizes the rules engine 323 and the Reasoner 324 processing at step 337. This process may be done gradually on an opportunistic basis so as not to disrupt business activities. The system may perform parallel tests as the legacy code 320 is collapsed. The parallel tests may compare the data being accessed by the legacy code 320 and the data accessed by the data grid objects 311. The parallel tests may synchronize any differences found during the comparison. In certain preferred embodiments, the parallel tests may provide a report including the number of successful and unsuccessful comparisons. The report may include exhibits demonstrating the failures when data was not properly transformed and saved. The report may also track the time needed to perform the parallel tests comparison.

With respect to step 338, the business platforms may be converted to utilize the rules engine 223 with the collapsed code 322 to access the data grid objects 311. This process may be done gradually (platform by platform) on an opportunistic basis so as not to disrupt business activities. These rules may be implemented into the rules engine 223 and in semantic relationships between the objects. The rules engine 223 and semantic network offer the advantage of simplifying the application code and introducing advanced business intelligence.

The Reasoner 324 may be implemented to enforce and infer the semantic relationships. The Reasoner 324 may make determinations based on the rules, the rules decision engine 323 and the semantic relationships. As data is transported to the data grid objects 311, the system may determine which rules should be harvested for use by the Reasoner 324 in making determinations using the data grid. For examples, rules relating to validation would be harvested because they assist in improving the agility and scalability of the system using the data grid, while rules relating to work flow would not be harvested because their usage in the data grid would not be optimized.

Figure 4:
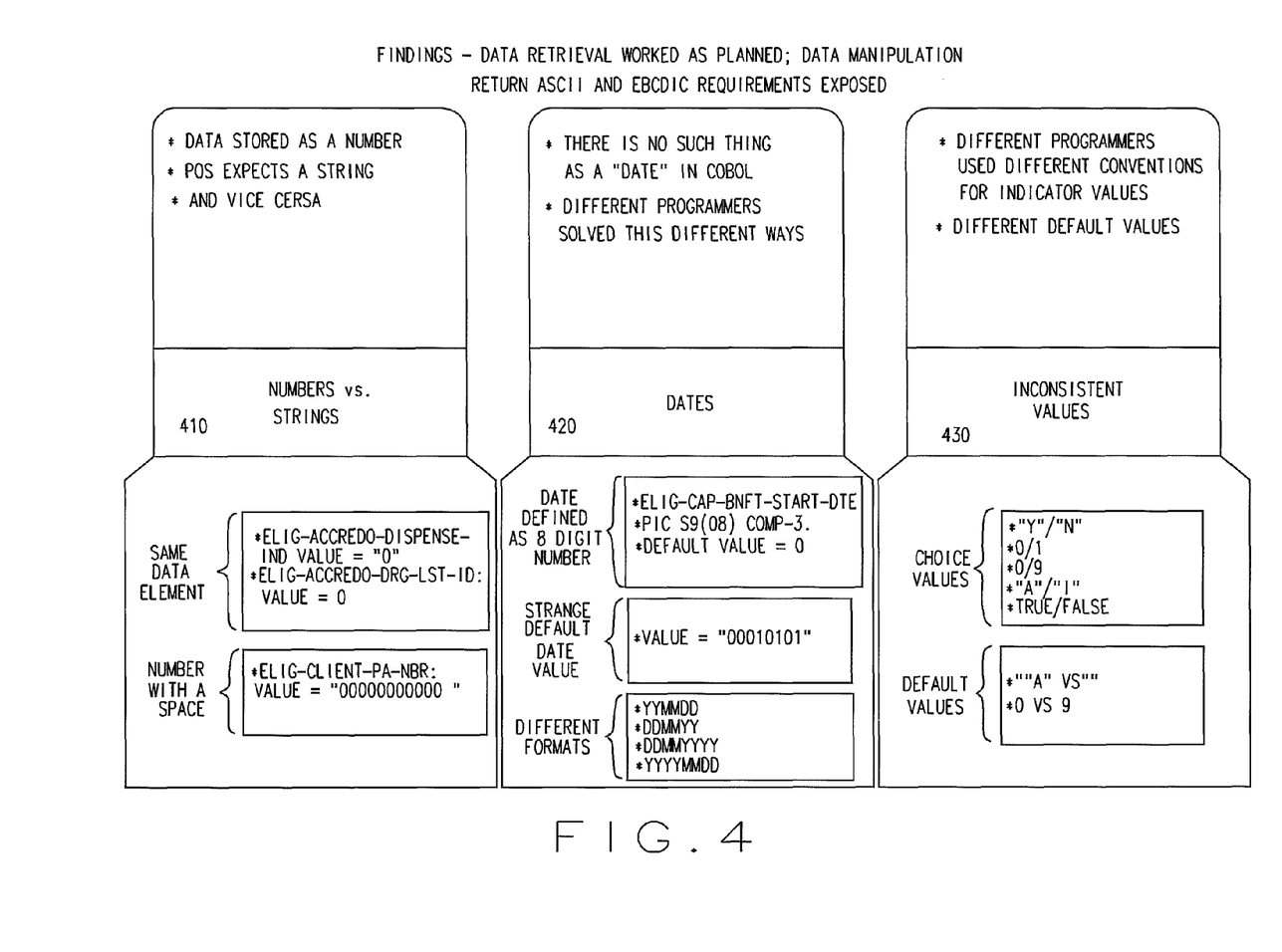
FIG. 4 depicts an illustrative example of a system for reconciling format differences in legacy data and grid data.

FIG. 4 illustrates an example of a system for reconciling format differences when comparing legacy data and grid data during the comparisons performed during parallel testing. For example, either the data grid or the legacy data may be stored in the different formats of numbers vs. strings 410. When the numbers vs. string 410 issue arises, the system may reconcile the data element stored as a number, such as for example the data element shown in the number format and reconcile it with the data element in the string format. The system will be able to compare the string and numeric formats to determine whether the date stored in the system is substantively the same. Another issue that may arise is the date 420 issue. The date issue 420 results because COBOL fails to identify a "date," and thus different programmers may define the date in different formats, such as, for example, an eight digit number, a strange default date value, or a variety of different formats. Again, the system will be able to compare this variety of formats to determine whether the date stored in the system is substantively the same. In another example, the inconsistent values 430 issue may arise. The inconsistent values 430 may result because different programmers use different conventions for indicator or default values. The system may be able to compare the variety of choice values or default values to determine whether the compared information is substantively the same.

Figure 6:
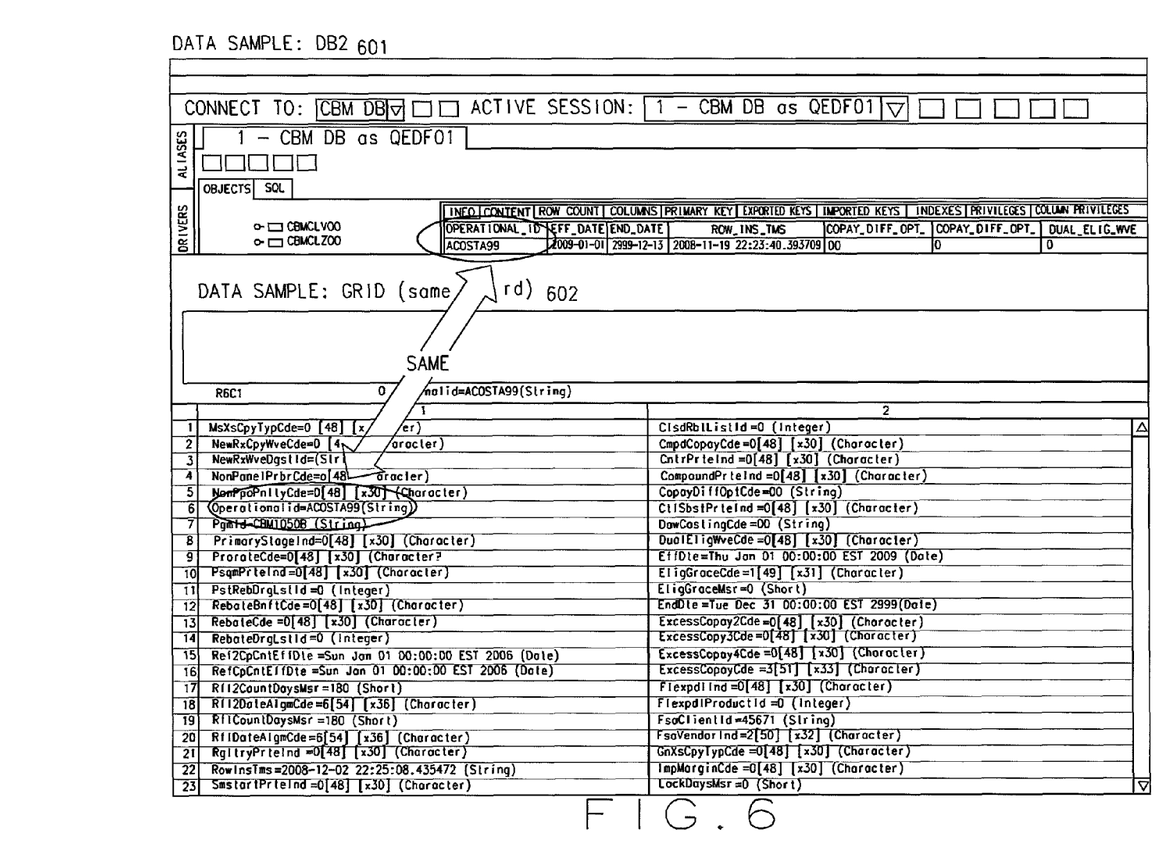
FIG. 6 depicts illustrative screen shots of data samples that may be compared for legacy data and grid data.

FIGS. 5 and 6, illustrate screen shots of legacy data and grid data that may be compared during parallel testing. FIG. 5 illustrates a screen shot for legacy database meta data 501 and a screen shot for object-oriented Java Storage Meta Data 502. The parallel tests may compare the legacy data meta data 501 to the data grid meta data 502. The parallel tests may be able to compare the fields in the legacy meta data 501 and determine that they are similar to the data types to the data grid meta data 502. If there are any differences in coding format, such as for example the differences outlined in FIG. 4, the parallel tests may be able to reconcile such format differences to determine whether the substantive data is the same. FIG. 6 illustrates a screen shot of a data sample from a legacy database 601 and a screen shot from a data sample from the data grid 602. The parallel tests may compare the legacy sample 601 to the data grid sample 602. The parallel tests may be able to compare the legacy sample 601 and determine whether it is the same or similar to the data grid sample 602. If there are any differences in coding format, such as for example the differences outlined in FIG. 4, the parallel tests may be able to reconcile such format differences to determine whether the substantive data is the same.

Figure 7:
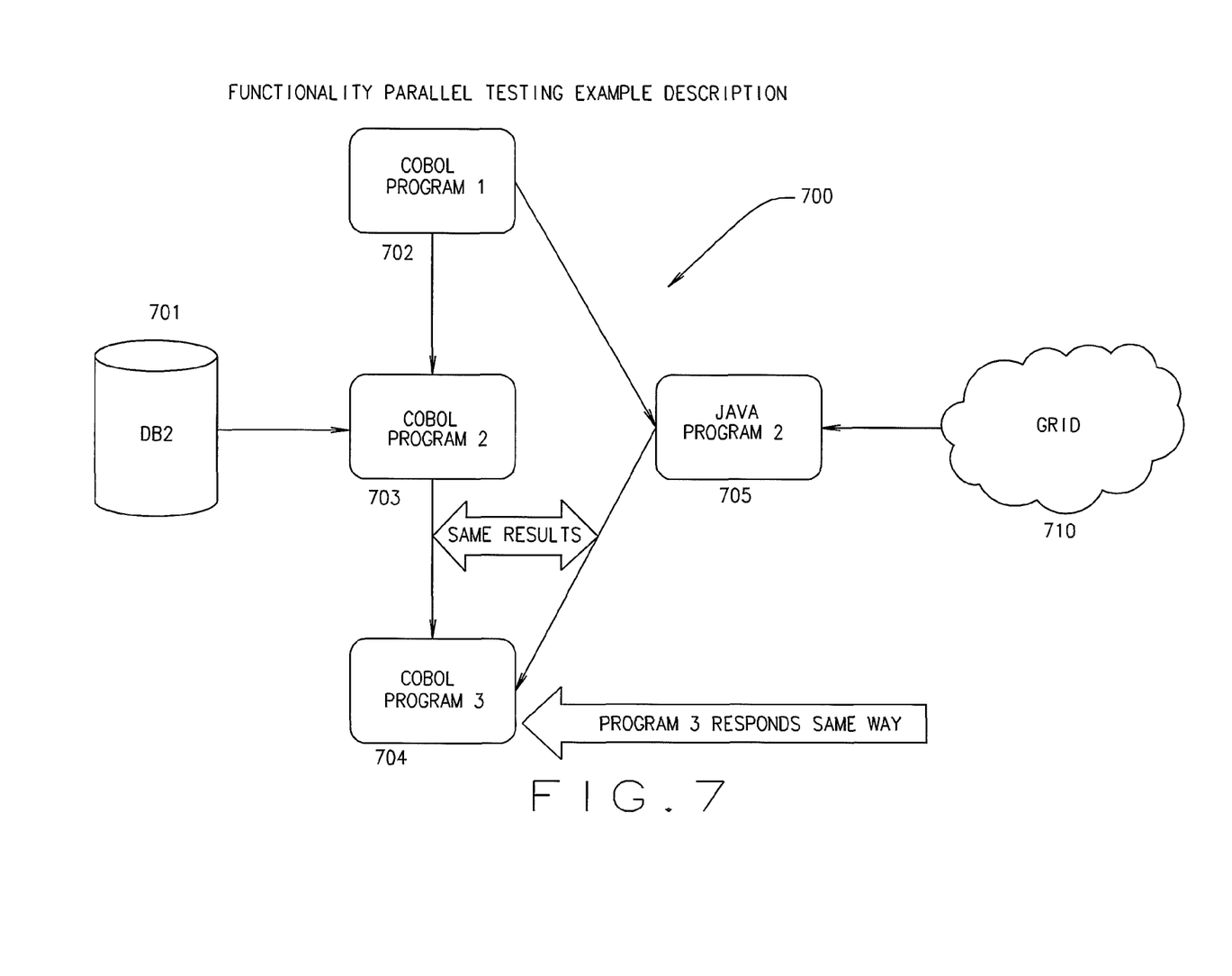
FIG. 7 depicts an illustrative high level flow diagram for performing parallel testing on legacy data system and data grid.

FIG. 7 illustrates a high level flow diagram for performing parallel testing. The system may perform a parallel test on a business platform's access to legacy database 701. The legacy Cobol program 2 (703) may retrieve the results from legacy database 702. The results from the program 703 may be compared to the results retrieved by Java Program 2 (705) from the grid 710. If the results from the program 703 are substantively the same as the results from program 705, then the parallel tests will determine both the legacy and the grid data are functioning successfully. If there are any differences in coding format, such as for example the differences outlined in FIG. 4, the parallel tests may be able to reconcile such format differences to determine whether the substantive data is the same. If the substantive results are different, the system may attempt to synchronize the grid and the legacy data.

FIG. 8 illustrates screen shots of the results from parallel tests performed on the legacy data and the grid. The parallel tests may compare the legacy results 801 to the grid results 802. If there are any differences in coding format, such as for example the differences outlined in FIG. 4, the parallel tests may be able to reconcile such format differences to determine whether the substantive data is the same.

While the foregoing description and drawings represent the preferred embodiments of the present invention, it will be understood that various additions, modifications, combinations and/or substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components, without otherwise, used in the practice of the invention, which are particularly adapted to specific environments and operative requirements without departing from the principles of the present invention. In addition, features described herein may be used singularly or in combination with other features. The presently disclosed embodiments are therefore to be considered in all respects as illustrative and not restrictive, the scope of the invention being indicated by the appended claims, and not limited to the foregoing description.

The invention claimed is:

1. A method comprising:
publishing, on a computer processor, legacy tabular data from a legacy data storage device into an object semantic model of a unified grid to create object data, the legacy tabular data associated with a plurality of business platforms of an entity, the unified grid supporting in-memory data storage;
performing, on the computer processor, parallel testing on access of the legacy tabular data in the legacy data storage device and the unified grid to verify accessed data consistency;
based on a successful result of performance of the parallel testing, dynamically mapping, on the computer processor, the legacy tabular data structures into a plurality of grid-based objects within the in-memory data storage of the unified grid;
modifying, on the computer processor, the plurality of business platforms to access the object data on the unified grid in the legacy data storage device based on mapping of the legacy tabular data structures;
modifying, on the computer processor, legacy code of the plurality of business platforms to create modified code that serves objects based on the object data instead of legacy tabular records sets;
harvesting, on the computer processor, a plurality of business rules from the modified legacy code; and
implementing, on the computer processor, the plurality of business rules in a rules engine and a semantic relationship between the objects in place of the plurality of business rules from the modified legacy code.

2. The method of claim 1, wherein modifying the plurality of business platforms to access the object data comprises:
modifying the plurality of business platforms to access the object data on the unified grid instead of the legacy tabular data in the legacy data storage device based on mapping of the legacy tabular data structures.

3. The method of claim 1, wherein modifying the plurality of business platforms to access the object data comprises:
modifying the plurality of business platforms to such a portion of the plurality of business platforms access the object data on the unified grid and another portion of the plurality of business platforms access the legacy tabular data in the legacy data storage device based on mapping of the legacy tabular data structures.

4. The method of claim 1, further comprising:
enforcing and inferring the semantic relationship between the objects.

5. The method of claim 1, wherein the legacy tabular data is stored on the legacy data storage device in the form of a relational database and a plurality of files.

6. The method of claim 1, wherein a business platform of the plurality of platforms is directed to member eligibility, a plurality of client profiles, prescriber information, a plurality of pharmacy networks, a plurality of maximum allowable cost files, a drug code master file, a plurality of provider claims, a patient history, a plan file, a prior authorization, a formulary, patient coverage, a drug utilization review, copay and pricing, and a benefit design.

7. The method of claim 1, wherein the object data of the unified grid is stored in random access memory that is striped and duplicated across a plurality of data banks.

8. The method of claim 1, wherein the unified grid includes an object framework that provides a centralized access point to the object data.

9. The method of claim 1, wherein the plurality of business rules includes information and logic relevant to business decisions of the entity.

10. The method of claim 1, wherein the plurality of business rules includes a first validation rule that relates to valid ranges for an insurance co-pay, a first validation rule for a set of valid identifiers for males or females across different platforms of the plurality of platforms, a workflow processing rule that requires that an incoming claim enter a prescription filling sequence after the incoming claim is validated, logic that requires that certain claims be processed.

11. The method of claim 1, wherein harvesting the plurality of business rules comprises:
selectively harvesting the plurality of business rules among a plurality of available business rules from the modified legacy code based on rule types that are applicable to the unified grid.

12. A non-transitory machine-readable medium comprising instructions, which when executed by one or more processors, cause the one or more processors to perform the following operations:
publish legacy tabular data from a legacy data storage device into an object semantic model of a unified grid to create object data, the legacy tabular data associated with a plurality of business platforms of an entity, the unified grid supporting in-memory data storage;
perform parallel testing on access of the legacy tabular data in the legacy data storage device and the unified grid to verify accessed data consistency;
based on a successful result of performance of the parallel testing, dynamically map the legacy tabular data structures into a plurality of grid-based objects within the in-memory data storage of the unified grid;
modify the plurality of business platforms to access the object data on the unified grid in the legacy data storage device based on mapping of the legacy tabular data structures;
modify legacy code of the plurality of business platforms to create modified code that serves objects based on the object data instead of legacy tabular records sets;
harvest a plurality of business rules from the modified legacy code; and
implement the plurality of business rules in a rules engine and a semantic relationship between the objects in place of the plurality of business rules from the modified legacy code.

13. The method of claim 1, wherein the publishing of the tabular data from the legacy data storage device into the object semantic model of the unified grid is performed by an extract, transform, load tool.

14. The method of claim 1, wherein performing parallel tests on the legacy tabular data and the unified grid further determines whether access through the legacy data storage device and the unified grid provide substantially the same results.

* * * * *